United States Patent Office 3,432,540
Patented Mar. 11, 1969

3,432,540
1-CHLORO-1,1-DINITRO-3-CYANO PROPANE
Marvin H. Gold, Sacramento, and Henry J. Marcus, West Covina, Calif., assignors to Aerojet-General Corporation, Azusa, Calif., a corporation of Ohio
No Drawing. Original application Nov. 26, 1963, Ser. No. 326,286. Divided and this application Nov. 4, 1966, Ser. No. 616,148
U.S. Cl. 260—465.7   1 Claim
Int. Cl. *C07c 121/14; C06c 1/02; C06b 7/00*

ABSTRACT OF THE DISCLOSURE

This patent described nitrile compounds having the formula

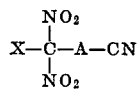

wherein A is an alkylene radical, preferably having from 1 to about 20 carbon atoms; and X is chloro or bromo. These compounds are prepared by reaction of terminal gem-dinitro nitriles with molecular chlorine or bromine. These compounds are useful as plasticizers for propellants.

---

This application is a division of application Ser. No. 326,286. filed Nov. 26, 1963, the disclosure of which is expressly incorporated herein by reference.

This invention relates to certain novel halo dinitro nitrile compounds and their method of preparation.

It is an object of this invention to prepare certain novel organic compounds.

It is another object of this invention to prepare novel nitro compounds by a novel process.

These and other projects of this invention will be apparent from the detailed description which follows.

The novel compounds of the present invention have the following general formula

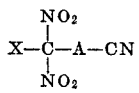

wherein A is alkylene, preferably containing from 1 to about 20 carbon atoms; and X is chloro or bromo.

In general, the compounds of this invention are prepared by reacting chlorine or bromine with the corresponding salt of an organic gem-dinitro compound in accordance with the following general reaction equation:

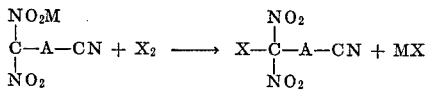

wherein A and X are as defined above, and M is an alkali or alkaline earth metal such as sodium, potassium, lithium, or calcium.

The above reaction is conveniently carried out in any inert polar or non-polar solvent in which the reactants are soluble, that is water, methanol, ethanol, benzene, chloroform, etc. The proportions of the reactants employed in the reaction are not critical. Normally, stoichiometrically equivalent amounts are used since this results in the most economical utilization of the reactants. The reaction temperature should normally be sufficienty high so that the reactants will dissolve to a substantial degree in the reaction medium, but in any event, the reaction temperature should be below the decomposition temperature of the reactants. Normally, the reaction is conducted at a temperature between about −20° C. and about +120° C. The most preferred temperature is from about −10° C. to about +50° C.

Pressure is not critical in this reaction. Therefore, while any pressure can be used, the reaction is normally run under atmospheric pressure. Agitation of the reactants such as by mechanical stirrer, while desirable in that it increases the reaction rate, is not necessary.

The novel compounds of this invention may be isolated in conventional manner such as by extraction, distillation and/or filtration.

To more clearly illustrate in our invention, the following example is presented. It is to be understood, however, that the example is intended merely as an illustrative embodiment of the invention. In the example, the percentages are by weight unless otherwise indicated.

EXAMPLE I

Preparation of 1-chloro-1,1-dinitro-3-cyano propane

To one mole of 1,1-dinitro-3-cyano propane (prepared by the addition of one mole of dinitromethane to one mole of acrylonitrile) is added 1 M potassium hydroxide at about 40 to 50° C. to form the potassium salt of 1,1-dinitro-3-cyano propane. About 100 grams of the salt is then dissolved in about 2 liters of water. Then 100 ml. of this equeous solution is charged to a 300 ml. round-bottom 3-neck flask fitted with stirrer, thermometer and gas inlet tube. At 0 to 10° C., chlorine gas is introduced with stirring. The addition of chlorine is continued for about 0.5 hour. The water is removed by evaporation under vacuum. The product 1-chloro-1,1-dinitro-3-cyano propane is obtained in good yields.

When the foregoing example is repeated utilizing 1,1-dinitro-3-methyl-3-cyano propane in lieu of 1,1-dinitro-3-cyano propane, 1-chloro-1,1-dinitro-3-cyano propane is obtained.

The compounds of this invention, which contain a plurality of nitro groups, are inherently useful as high explosives. These compounds can also be used in any conventional explosive missile, projectile, rocket or the like, as the main explosive charge. An example of such a missile is described in U.S. Patent 2,470,162, issued May 17, 1949. One way of using such high explosives in a device such as that disclosed in U.S. Patent 2,470,162 is to absorb the liquid explosive in an absorbent material such as cellulose, wood pulp, or sawdust. The resultant dynamite-type explosive can then be packed into the warhead of the missile. A charge thus prepared in sufficiently insensitively to withstand the shock entailed in the ejection of a shell from a gun barrel or a rocket launching tube under the pressure developed from ignition of a propellant charge, and can be caused to explode on operation of an impact or time-fuse mechanism firing a detonating explosive such as lead azide or mercury fulminate.

The compounds of this invention are especially useful as antibiotics and as anti-fungals. In this respect, the compounds of this invention wherein X is chloro are for superior in effectiveness to the corresponding bromo compounds.

Application of the antibacterial and antifungal compounds of this invention for the various purposes disclosed may be made from solutions in suitable solvent carriers, such as alcohol, benzene, and petroleum naphtha, or from dispersions in aqueous or other media, or in the form of a dust. They may be used in combination with supplementary agents, such as talc, bentonite, tricalcium phosphate, various clays, spreading agents, stickers and other adjuvants commonly used in bacteria and fungus control compositions. They may also be used in combination with other bacteria and fungus control agents, such as sulfur fungicides or organic fungicides and various other agents commonly used in fungicidal and insecticidal applications. When the bactericides and fungicides of this invention are used in conjunction with adjuvants, the active ingredient is employed in a bactericidally or fungicidally effective amount, normally from about 0.01% to 90% by weight of the total composition. Caution should be used in using these products since many of them are irritant to the skin.

We claim:
1. The compound 1-chloro-1,1-dinitro-3-cyano propane.

References Cited

UNITED STATES PATENTS

| | | | |
|---|---|---|---|
| 2,891,994 | 6/1959 | Klager | 260—583 XR |
| 3,038,939 | 6/1962 | Klager | 260—583 |

OTHER REFERENCES

Parker et al.: C.A., 57, pp. 8428–8429 (1962).
Patterson: J.A.C.S., 55 (1933), pp. 3916–3917.

JOSEPH P. BRUST, *Primary Examiner.*

U.S. Cl. X.R.

149—34, 35, 88; 260—465.1; 424—304